TILESETTER LOADING DEVICE

Filed Aug. 24, 1965 12 Sheets-Sheet 1

INVENTOR
MITCHELL FRIEDMAN
BY Howard T. Jeandron
AGENT

Dec. 10, 1968 M. FRIEDMAN 3,415,390

TILESETTER LOADING DEVICE

Filed Aug. 24, 1965 12 Sheets-Sheet 2

INVENTOR
MITCHELL FRIEDMAN
BY Howard J. Jeandron
AGENT

INVENTOR.
MITCHELL FRIEDMAN
BY Howard T. Jeandron
AGENT

Dec. 10, 1968 M. FRIEDMAN 3,415,390

TILESETTER LOADING DEVICE

Filed Aug. 24, 1965 12 Sheets-Sheet 4

INVENTOR.
MITCHELL FRIEDMAN
BY Howard T. Jeandron
AGENT

INVENTOR.
MITCHELL FRIEDMAN
BY Howard J. Jeandron
AGENT

INVENTOR.
MITCHELL FRIEDMAN
BY Howard S. Jeandron
AGENT

Dec. 10, 1968 M. FRIEDMAN 3,415,390

TILESETTER LOADING DEVICE

Filed Aug. 24, 1965

12 Sheets-Sheet 7

INVENTOR.
MITCHELL FRIEDMAN

BY Howard T. Jeandron

AGENT

Dec. 10, 1968 M. FRIEDMAN 3,415,390

TILESETTER LOADING DEVICE

Filed Aug. 24, 1965 12 Sheets-Sheet 8

INVENTOR.
MITCHELL FRIEDMAN
BY Howard J. Jeandron
AGENT

INVENTOR.
MITCHELL FRIEDMAN
BY Howard T. Jeandron
AGENT

Dec. 10, 1968 M. FRIEDMAN 3,415,390

TILESETTER LOADING DEVICE

Filed Aug. 24, 1965 12 Sheets-Sheet 10

INVENTOR.
MITCHELL FRIEDMAN
BY Howard J. Jeandron
AGENT

TILESETTER LOADING DEVICE

Filed Aug. 24, 1965 12 Sheets-Sheet 11

INVENTOR.
MITCHELL FRIEDMAN
BY Howard T. Jeandron
AGENT

Dec. 10, 1968 M. FRIEDMAN 3,415,390

TILESETTER LOADING DEVICE

Filed Aug. 24, 1965 12 Sheets-Sheet 12

INVENTOR.
MITCHELL FRIEDMAN
BY Howard T. Jeandron

United States Patent Office 3,415,390

Patented Dec. 10, 1968

3,415,390

TILESETTER LOADING DEVICE

Mitchell Friedman, Yorktown Heights, N.Y., assignor to Atco Ceramics Corp., Keyport, N.J.

Filed Aug. 24, 1965, Ser. No. 482,155
11 Claims. (Cl. 214—16.4)

ABSTRACT OF THE DISCLOSURE

A mechanized tile handling and loading apparatus designed to protect the decorated face of said tile having conveyors to pick up tile in a single line and transfer the flow of tile into two parallel lines to be advanced into a loading position for each line of tile and load one tile from each line of tile into a pair of parallel slots in a setter in a timed relationship so that the setter can be moved upward one shelf at a time until all shelves are loaded and said setter is picked up and moved into a furnace for firing said tile and further in which said tile are retained in a horizontal relationship and advanced horizontally and moved upward when loaded so as to prevent any debris or foreign matter from falling upon the face of said tile.

This invention relates in general to machines for the manufacture of structural and/or ornamental tile and more particularly to a machine for the automatic continuous stacking of uniformly prepared tiles that are to be processed in a kiln.

When the tile has been formed of uniform size and shape from a mixture of plastic refractory materials, the unfired tile must be supported and positioned in a refractory holder or setter which is then loaded into a kiln where the tiles are fired to change the plastic material into a hard tile. The formed tile while in a plastic stage must be handled with care, particularly to avoid handling the top surface where glazing material may be present. Presently the unfired tiles are loaded by hand into the setter shelves, generally starting with the top shelf and loading downward, to avoid the possibility of dropping dirt or any particles on the freshly glazed top surface of each tile. To achieve a reasonably rapid flow of tiles into kiln, a considerable amount of hand labor is required.

It is an object of this invention to provide a completely automatic tile loading mechanism.

It is a further object of this invention to provide a machine including a transfer system for a continuous flow of flat tile in which a transfer unit moves said tile into position in alignment with a shelf opening in a ceramic setter or tile holding device and further in which each tile is moved at a controlled velocity from said transfer unit into said setter or holding devices and in which said setters or holding devices are supplied continuously and said setters when fully charged are automatically discharged from said machine for further processing in a kiln.

Other objects of this invention shall be apparent by reference to the accompanying detailed description and the drawings in which—

Figure 14:
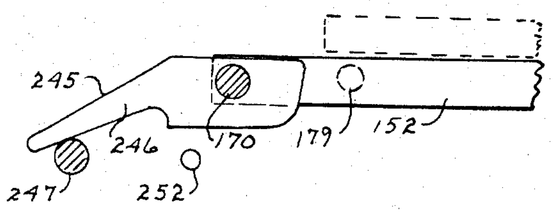
Figure 15:
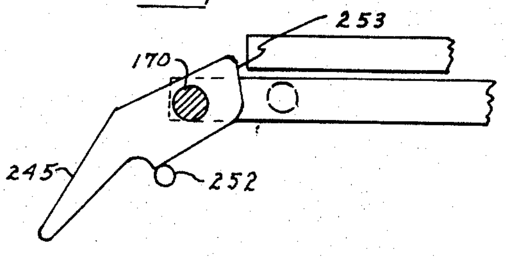
Figures 3, 12:
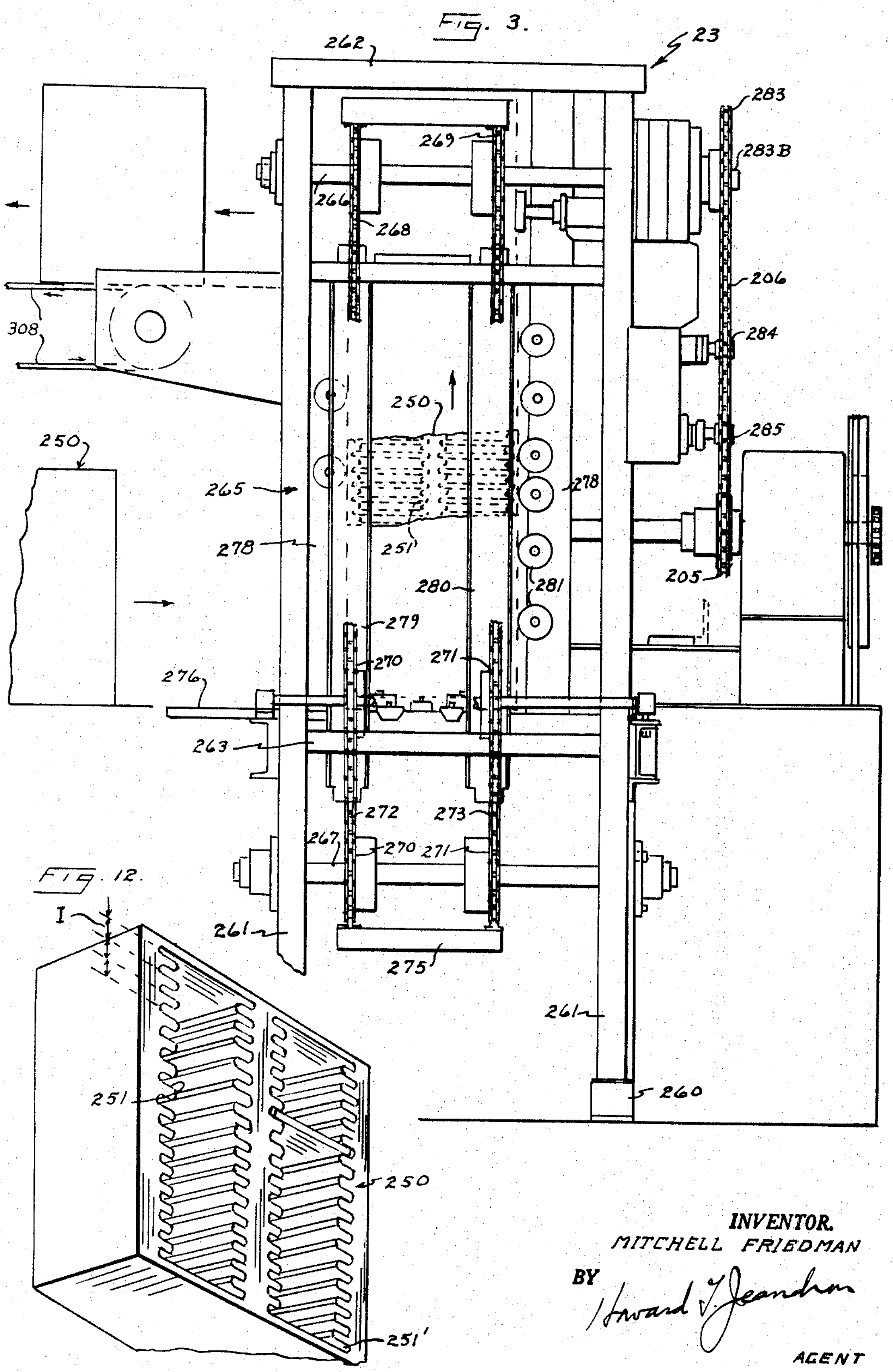
FIG. 3 is an end elevational view taken on line 3—3 of FIG. 2.
Figures 4, 5, 6, 7:
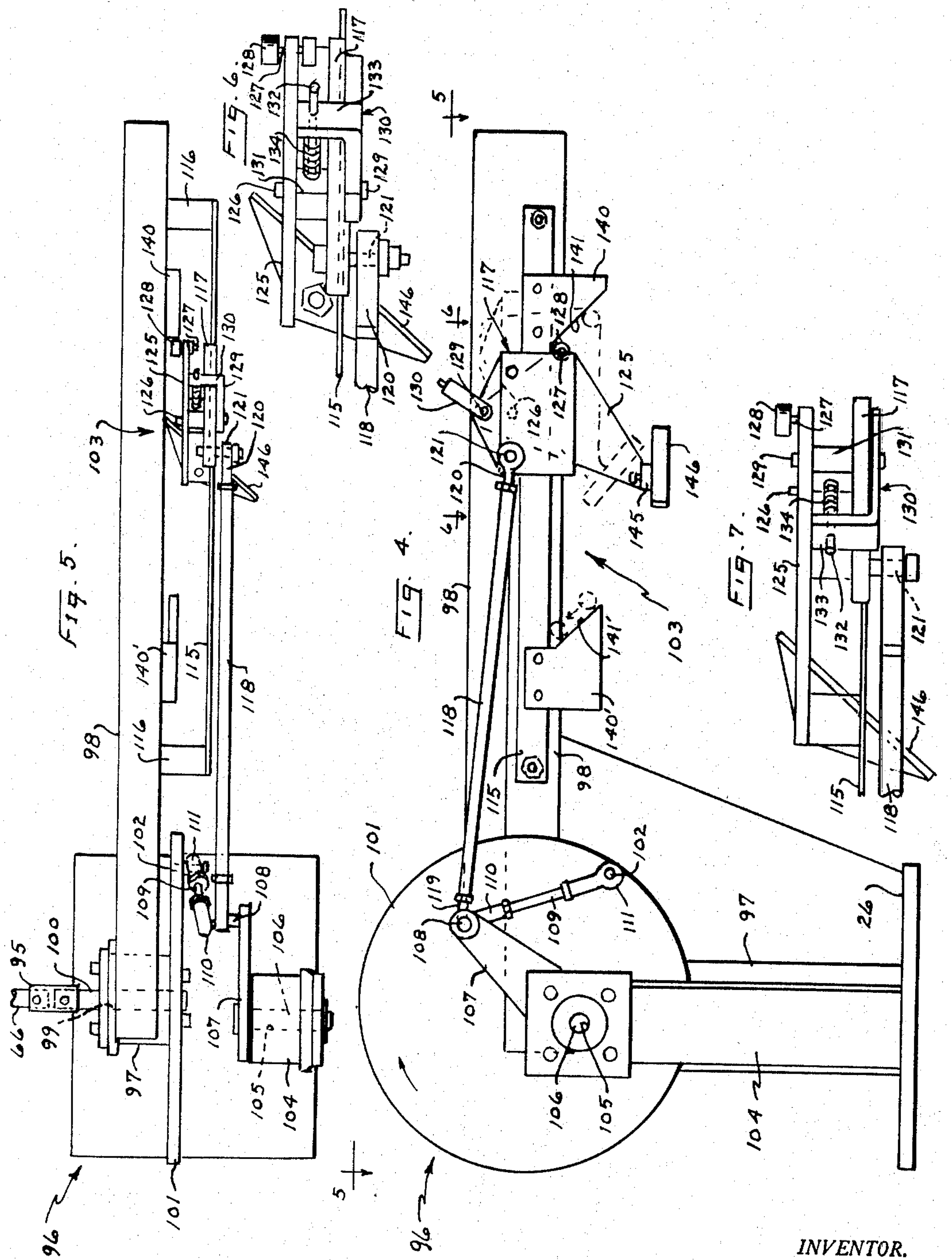
Figures 8, 9:
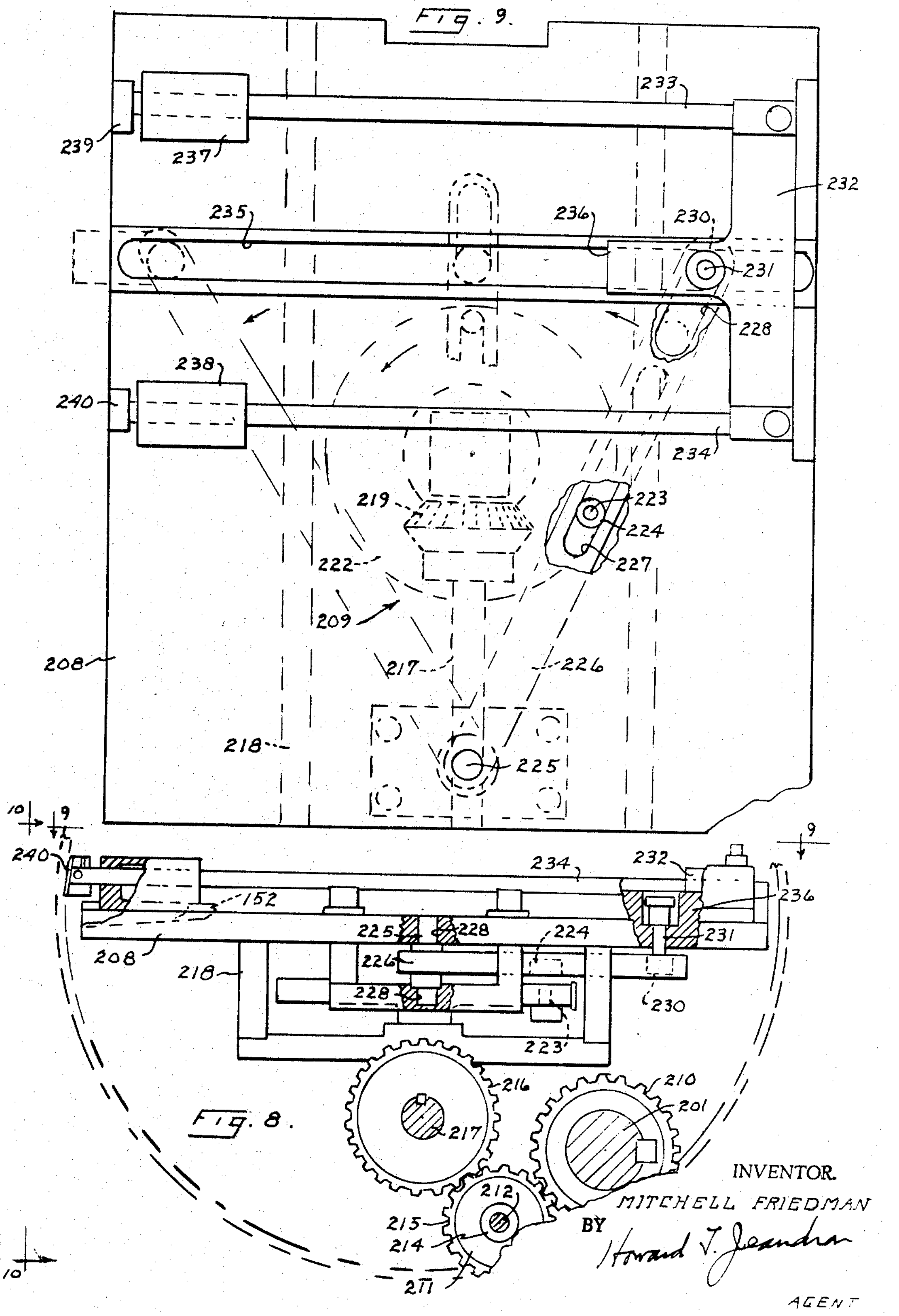
Figures 10, 11, 13:
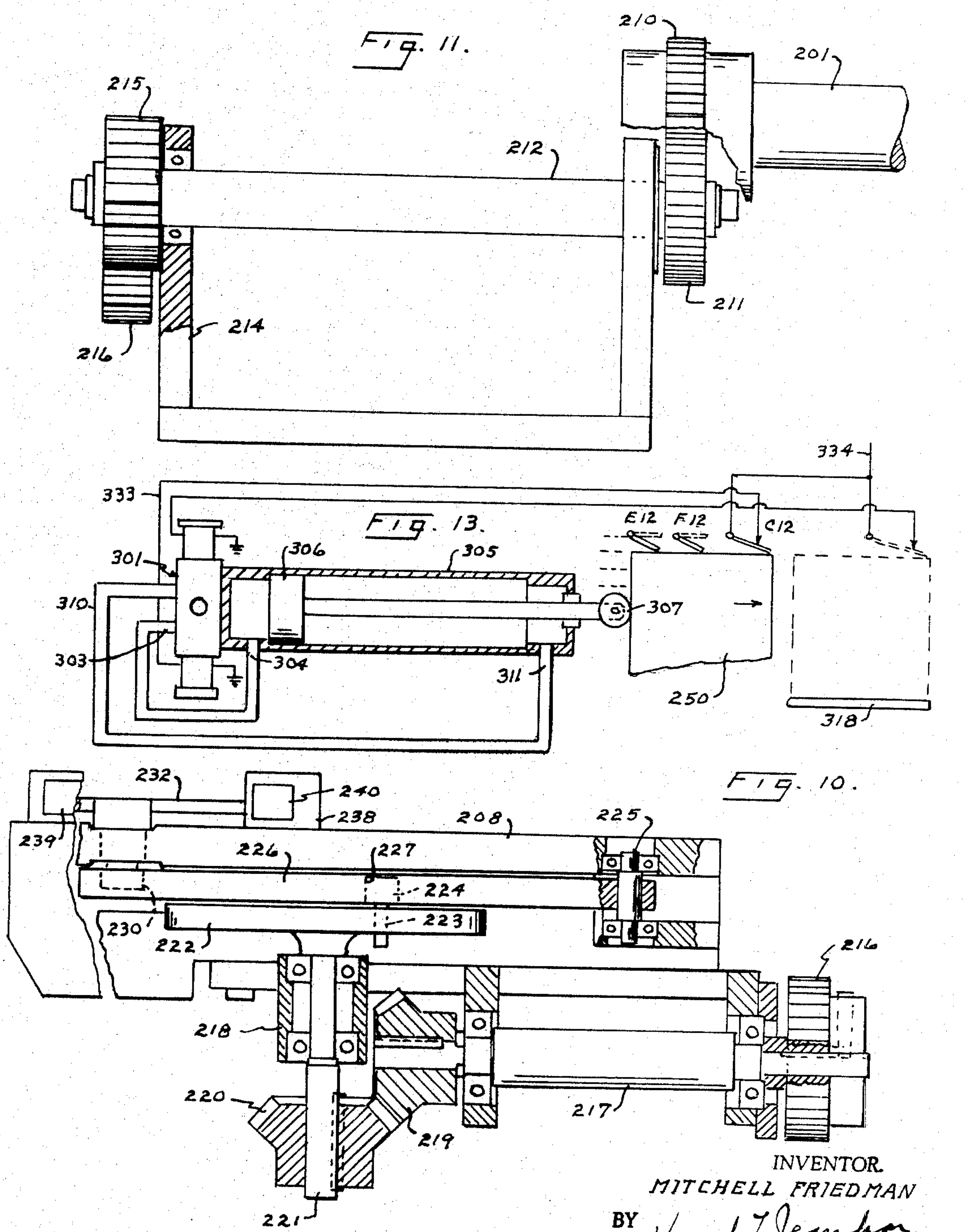
Figure 16:
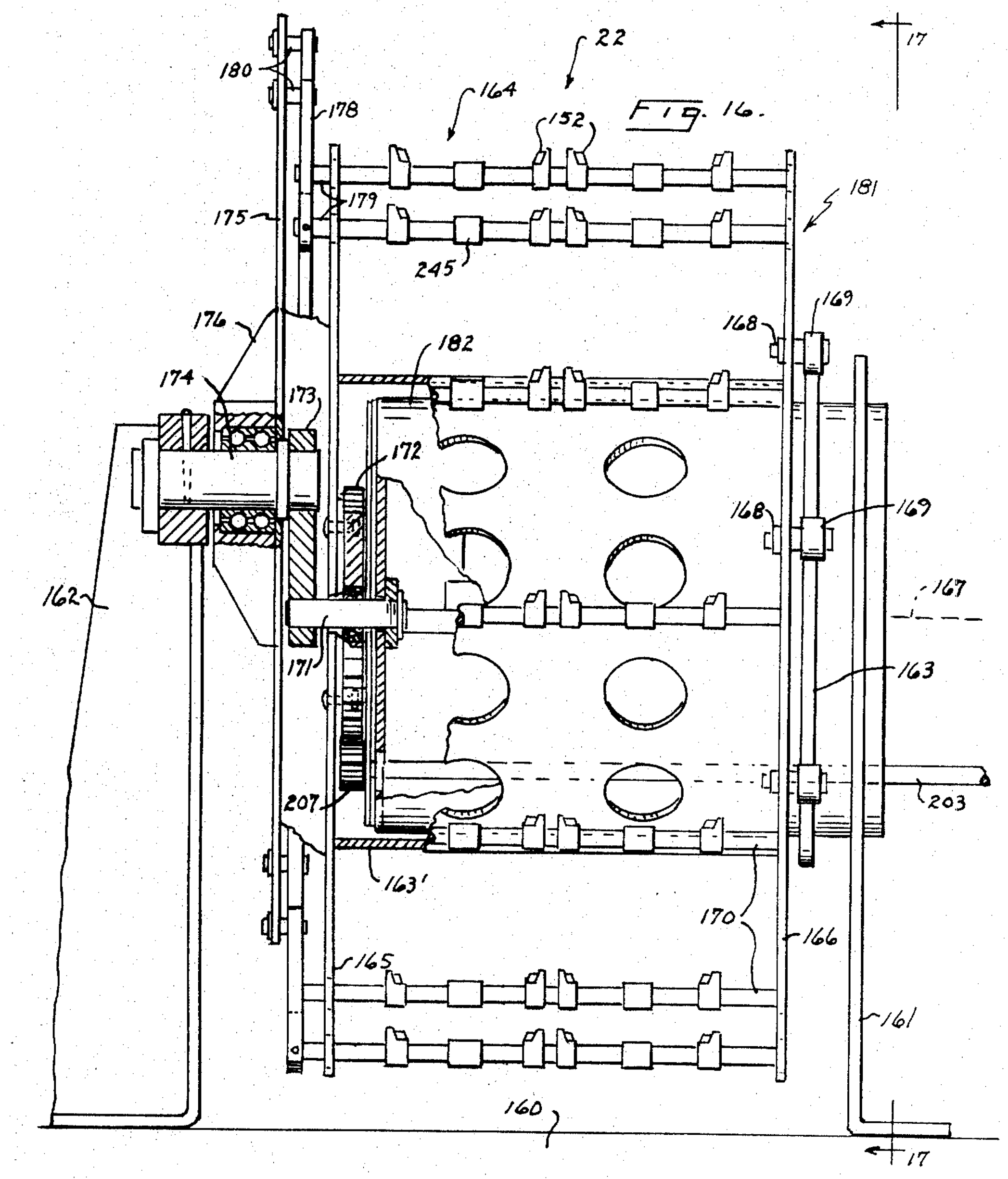
Figure 17:
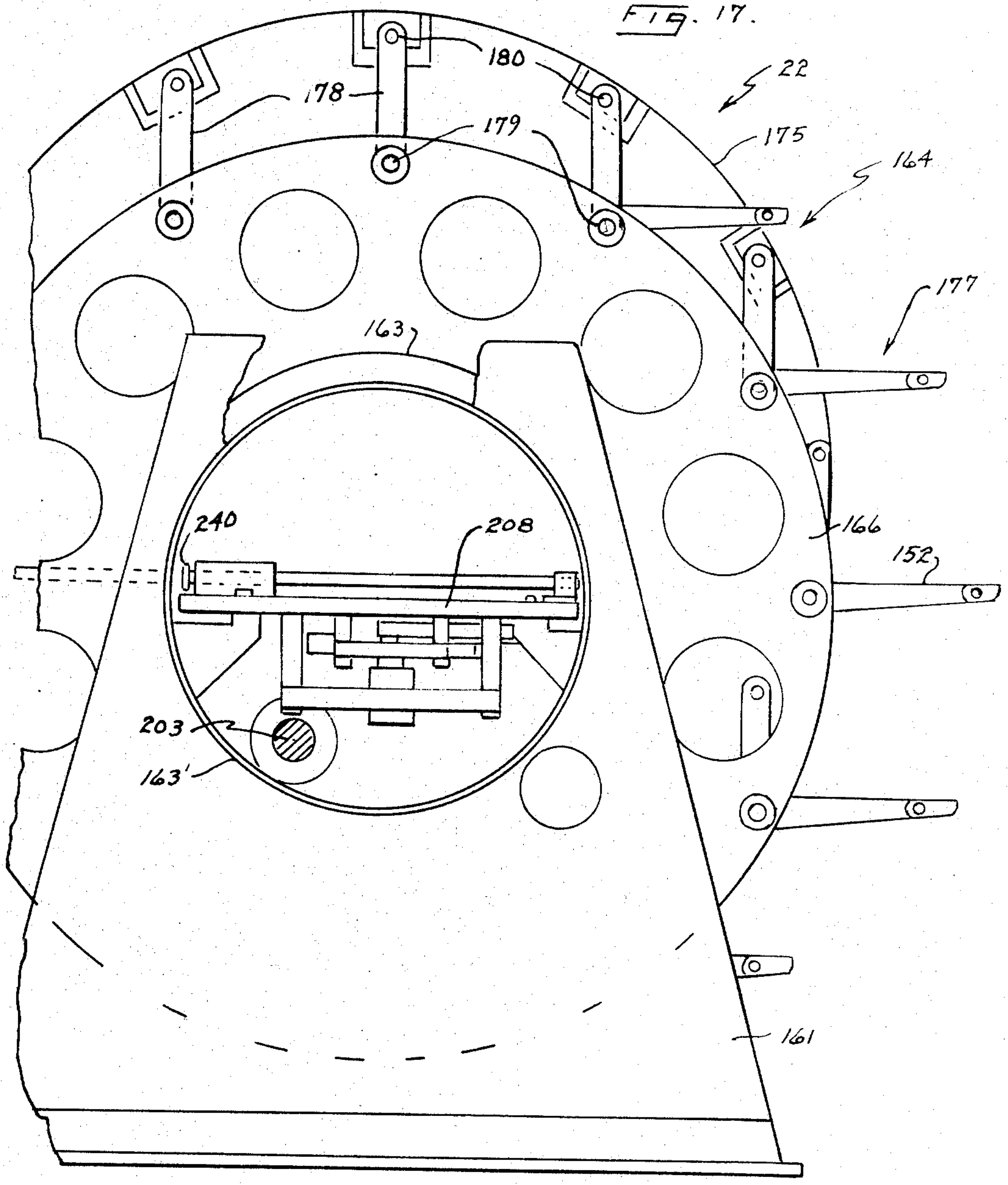
Figure 19:
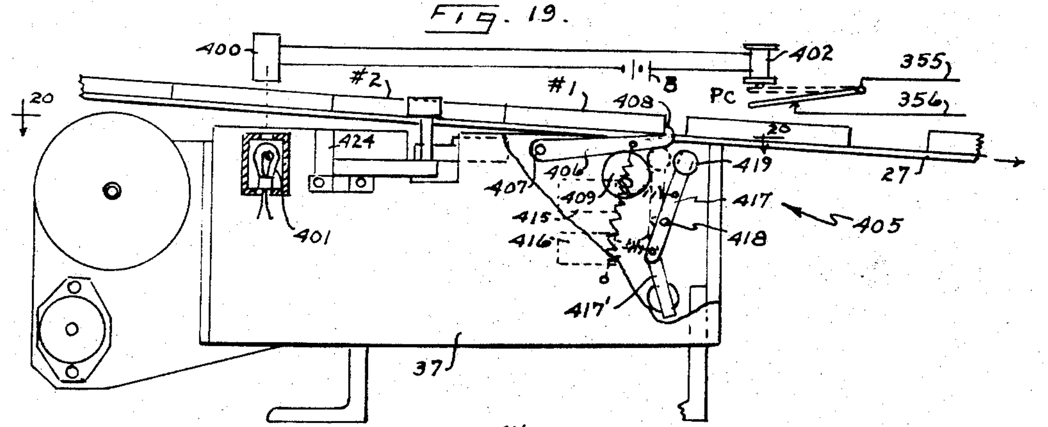
Figure 20:
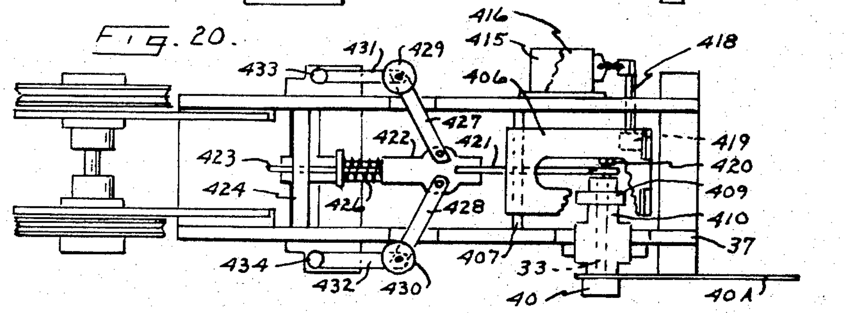
Figure 18:
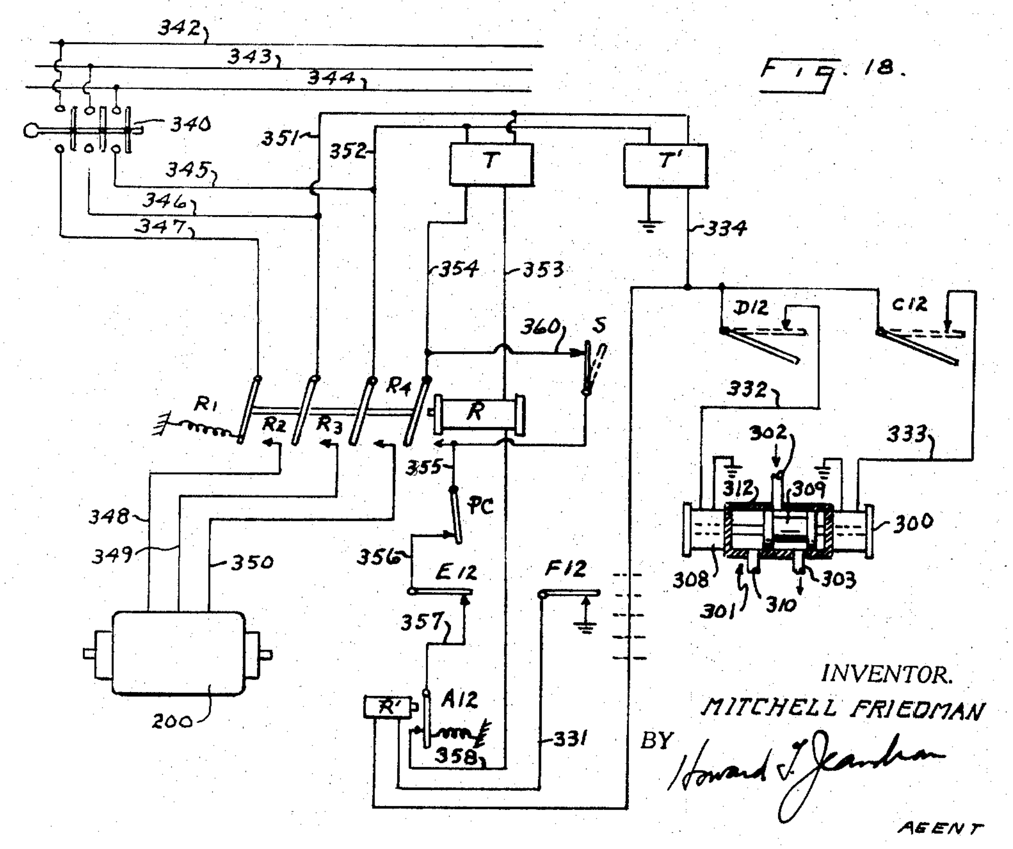
Figures 21, 22:
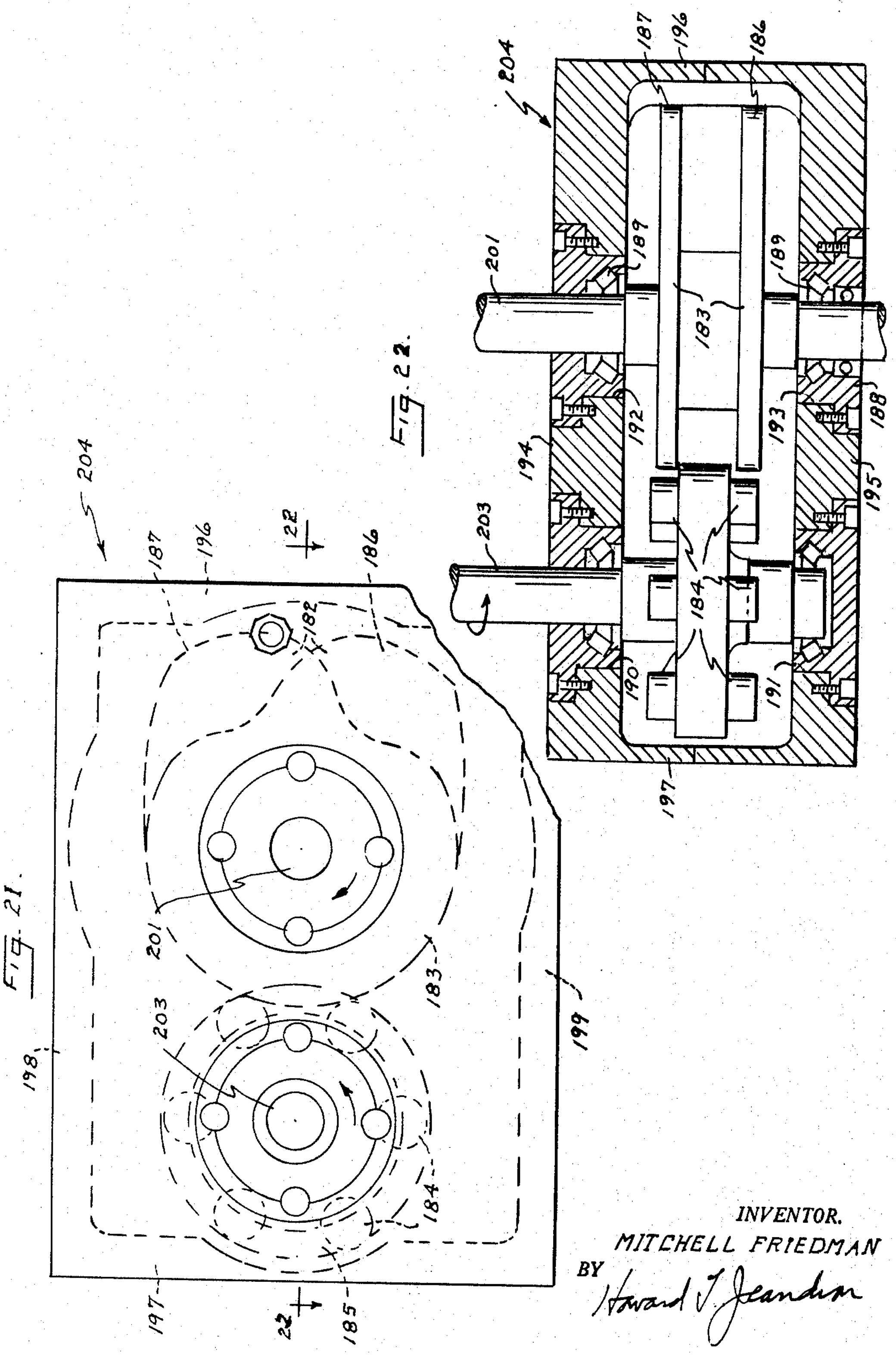

FIG. 4 is a side elevational view of the tile transfer device taken on line 4—4 of FIG. 1, FIG. 5 is a plan view taken on line 5—5 of FIG. 4, FIG. 6 is a plan view of the pusher element in the up position taken on line 6—6 of FIG. 4, FIG. 7 is a plan view of the pusher element in the down position, FIG. 8 is an end elevational view partly in cross section taken on line 8—8 of FIG. 1, FIG. 9 is a plan view taken on line 9—9 of FIG. 8, FIG. 10 is a side view partly in cross section taken on line 10—10 of FIG. 8, FIG. 11 is a cross-sectional view taken on line 11—11 of FIG. 1, FIG. 12 is a perspective illustration of a tilesetter, FIG. 13 is a schematic detail of the pusher for ejecting the loaded setters and its operating circuit and components, FIG. 14 is a side elevational view partly in cross section of the tile loading guide in a guide position, FIG. 15 is a side elevational view of the tile loading guide in a stop position, FIG. 16 is an end elevation partially in cross section taken on line 16—16 of FIG. 1, FIG. 17 is a side elevational view taken on line 17—17 of FIG. 16, FIG. 18 is a schematic detail of the operating circuit and components, FIG. 19 is a schematic detail of the escapement circuit and controlling switches, FIG. 20 is a plan view taken on line 20—20 of FIG. 19, FIG. 21 is a front elevational view taken on line 21—21 of FIG. 1, and FIG. 22 is a cross sectional view taken on line 22—22 of FIG. 21.

In accordance with the objects of this invention there is provided all of the mechanism necessary to receive a continuous flow of flat tile in a single stream for the purpose of stacking said tile in successive slots or shelves in a double tier refractory tile holding element for kiln processing in which the tiles are received upon a flat conveyor system provided in this device and said tiles are progressively released and progress into a uniformly spaced or timed flow. Further in accordance with the objects of this invention there is a means provided to divide said uniformly spaced single line of tiles into two lines. Still further in accordance with the objects of this invention, there is provided a transfer mechanism which picks up each tile separately and transfers each tile to a loading position and stops momentarily to permit a pusher element to move the tile from the transfer mechanism to a shelf in the setter. The setter is intermittently elevated in synchronism with the transfer device to provide the alignment of the next shelf of the stacking element with the next pair of tiles on the transfer mechanism for a repeated operation until each shelf of the setter has been filled and the setter reaches a discharge position where it is automatically ejected for further processing in a kiln. Both the transfer device and the elevating means must stop and remain stopped for a dwell period after a tile is moved into position opposite to a shelf opening in a setter. During the movement of the unfired tiles there are certain functions that must be considered; all tiles must be handled with extreme care to prevent chipping or breaking. The contact velocity between the tiles and any machine element must be low enough to prevent tile from being chipped or broken. The acceleration of any tile carrying machine element must be below that which might cause the tile to be bounced or to lose its alignment during its progression of movement through the entire operation.

A further consideration is the protection of the freshly glazed tops of the tiles. Any falling particles of dust or grit must be avoided. In the normal forward movement of the tiles on the conveyors, there is very little disturbance or cause to produce falling particles that might damage the glazed surface of the tiles. However, where there is an actual charging or movement of the tile from one machine element to another, the possibility of falling dust or grit is greatly increased, therefore where this occurs in loading the tile into the setters, the tile must be loaded starting with the top shelf of the setter and in a downward progression, thus falling dust or dirt cannot fall upon a glazed tile surface.

Regarding the double tier setter and the division of a single stream of tile into two streams with the titlesetters illustrated and described, it will be found that many tile setters are generally formed in two tiers to receive two columns of tiles. Since the setters or tile holders of refractory ceramic are the accepted elements for firing tile, the loading of the tile into a setter should be in pairs, that is, two tiles are preferably inserted into a pair of shelves in the setter in a simultaneous operation. The entire operation is continuous and automatic, an operator acts only in the event of a malfunction of the device.

Referring to the drawings in which the construction of the device is specifically set forth and in which the operation of the device can be more specifically outlined, there is illustrated a tile handling and stacking mechanism 20. The mechanism 20 may be divided into three units, unit 21 being the tile receiving conveyor which moves said tile from a continuous single line supply and by means of an escapement device (to be described later) provides a flow of tile consistent with the speed of operation of the total machine. More specifically the escapement device stops each tile to feed each tile onto the conveyor in a predetermined spaced relationship, in effect spacing the tile according to the timed flow to provide the tile at the pick up station to be picked up by the transfer mechanism in unit 22. Due to the fact that the commonly used setter, for holding tile for firing, is a double tier design, the tile must be loaded into the setter in pairs. Therefore the advancing spaced tile is divided in unit 21 from a single line flow to a double line flow, by a divider device illustrated in FIGS. 4 and 5 and to be described later, without interrupting the timed flow. In addition the escapement device is also used to interrupt the flow of tile providing a stoppage in the flow which is predetermined to stop the feeding of tile at regular intervals, so that when a setter is fully loaded with tile, the flow of tile stops, the flow resuming when the next setter is in a loading position. The double line of tile from the first unit 21 passes to the second unit 22, unit 22 being the transfer unit which picks up each pair of tiles from the first unit and positions each pair of tiles in a parallel relationship for charging into the third unit 23. Unit 23 in turn receives each pair of tiles successively in a progressively raised setter until the setter is filled and elevated to a position where it is ejected from unit 23. Referring to unit 21, FIGS. 1 and 2, the unit 21 is supported on a table-like structure 25, the bed or base 26 of unit 21 resting upon the top of the tablelike structure 25. The bed or base 26 in turn supports the progressive elements of unit 21, the first element of unit 21 being a continuous belt conveyor 27 which is loaded with tile by the intermittent release of the tile by the escapement mechanism illustrated in FIGS. 19 and 20.

Referring to FIG. 19, the tiles are supplied in a continuous stream on a conveyor as illustrated. The tiles must be supplied in abutting relationship, but in the event the supply or flow stops, the photo-cell 400 positioned above the tile will be energized by a light beam from the lamp 401. When the photo-cell is energized a circuit is completed through battery B to a relay 402. Relay 402 opens switch PC breaking the main circuit to motor 200 (FIG. 18). Assuming the tiles are supplied in a continuous flow (FIG. 19) it is necessary to feed the tiles on conveyor 27 in an equally spaced relationship to provide the desired flow consistent with the speed of operation of the whole machine. To accomplish this an escapement device 405 is provided. This is comprised of the following components, a pivotally supported element 406 supported upon a cross rod 407, rod 407 being supported on either side by the supporting structure 37 to be identified later. The pivotal element 406 is provided with an upturned lip 408 so that in the raised position of element 406, lip 408 will protrude in front of the tile supported on the conveyor to act as a stop and prevent the flow of the tile. Element 406 is raised and lowered intermittently by a cam 409, cam 409 being affixed to a shaft 33, shaft 33 extending through bearing 410 mounted in the supporting element 37 and provided with a sprocket 40 and being driven by a chain 40A that is mounted upon a sprocket 41 on shaft 42. Shaft 33 on the end opposite to sprocket 40 is provided with an offset crank pin 420. Pivotally attached to pin 420 is a connecting rod 421. The opposite end of the connecting rod 421 is in turn attached to a reciprocatable block 422. Block 422 is slidably mounted on a central rod 423 that extends through and is supported by a cross frame member 424. A spring 426 is mounted on rod 425 between member 424 and the block 422 to thus bias the block forward (FIG. 20). Block 422 is also provided with a pair of arms 427 and 428 that are pivotally supported in block 422. Arms 427 and 428 at their opposite ends support clamps 429 and 430 and are pivotally connected to one end of a pair of arms 431 and 432, the other end of arms 431 and 432 are pivotally attached by pins 433 and 434 to the frame 37. Thus when shaft 33 is rotated by the drive it will not only raise and lower element 406 but it will, by means of the crank pin 420, provide a reciprocating motion to block 422. The spring 426 will cause the block 422 to move forward (FIG. 20). The block 422 by means of the linkage 427, 428 and 431, 432 will move the pair of clamps 429, 430 inward when it is moving forward (FIG. 20), and outward when it is moving rearward. Since the clamps 429, 430 are positioned either side of the advancing tiles (FIGS. 19 and 20) the action of the clamps will be to grasp the sides of the tile in position when block 422 moves forward. The clamps will release their grasp when block 422 moves rearward. The position of the crank pin relative to the cam is such that as the stop element 406 is dropped to release the first tile, the clamps 429 and 430 are already bearing upon the sides of the second tile, restraining the tiles behind it. As element 406 is being raised, only then are the clamps released allowing the entire line to move up one tile length. The operations are thus alternately continued, which provides escapement action. It is apparent that with the drive of chain 40A, shaft 33 will be rotated thus rotating the cam 409 thus intermittently lowering element 406 and alternately clamping the tile #2 to provide an equal predetermined spacing between tiles as they leave the escapement device 405. Element 406 is biased by a spring to remain in contact with cam 406. The spacing between tiles is thus controlled to insure that the tiles at the pick up station are in exact synchronism with the pick up of the transfer mechanism. The escapement device 405 is also operated in relation to unit 23, the elevating mechanism to be described later. The tiles are advanced in successive order on the belt conveyor 27. A supply conveyor simply supplies a continuous flow of tiles. However in the event the tile flow stops, there is provided a switch PC operated by a photo-electric cell 400 (FIG. 19) to indicate there are no tiles being supplied. The switch is in the main operating circuit (FIG. 18) so that when it is opened by the photo-cell, the entire machine stops. The belt conveyor 27 is comprised of two spaced parallel V belts $27^1$ and $27^2$. The spacing of the belts is less than the width of a tile so that each tile being fed onto conveyor 27 actually rests upon each V belt $27^1$ and $27^2$ with an open area between. The belts $27^1$ and $27^2$ are mounted about a plurality of V pulleys 28, 30, 31 and 32 so that the V belts rotate in unison and in the same direction. The pulleys are in turn supported on shafts 32, 33, 34, 35 and 36. The shafts are in turn supported on one side of the belt by a structural side element 37 that rests upon and is affixed to the base 26 and on the opposite side by a structural side element 38 that also rests upon and is affixed to base 26. Shaft 34 passing through element 37 is provided on the exterior surface with a V pulley 39 that is affixed thereto to rotate with shaft 34. In alignment with sprocket 40 is a second sprocket 41 mounted on a shaft 42, and driven by a chain 40A, shaft 42 being supported between elements 37 and 38. Positioned on shaft 42 there are a pair of sprockets 43 and a pair of "flat top" drive chains 44 rotating about sprockets 43. Chains 44 support a plurality of flat wide flights to provide a width that will fit between the V belts $27^1$ and $27^2$. Thus the V belts $27^1$ and $27^2$ will carry the tile to a point beyond shaft 33 where the flat wide flight conveyor chains 44 start. Sprocket 43 carries chain 44 within the confines of the V belts $27^1$ and $27^2$ so that each tile moves from the two V belts onto the flat flights of chain 44 and is carried forward. Both chains 44 at their opposite ends are mounted on sprockets 45 which are in turn mounted on shaft 46. Thus the flat top chains 44 will carry two lines of tile which are provided by the transfer mechanism 90 to be described later, forward to the point where the belts turn downward about sprockets 45. However, two conveyors 73, $73^1$, each in the form of two V belts that are mounted on V pulleys 71 and 72, are positioned on either side of the flat top chains 44. They will pick off the tile from said chains 44 carrying each line of tile forward. One pair of V pulleys 71 and 72 are mounted on a shaft 70, the other pair of V pulleys are mounted on shaft $70^1$. Shafts 70 and $70^1$ are mounted between the structural side elements 37 and 38. On the outer end of shafts 70 and $70^1$ there are provided sprockets 74 that are connected by means of chains 75 to sprockets 47 that are mounted on shaft 46 to be driven thereby. The paired belts 73, $73^1$ in addition to being driven by pulleys 71–72 rotate upon V-shaped pulleys 76 and 77. Referring back to shaft 46, the V pulley 48 affixed thereto is connected by means of a V belt 55 to the V pulley 39 to drive shaft 34 which drives conveyor 27. At the same time chains 44 are driven by sprockets 45 mounted on shaft 46 to drive sprockets 43 and shaft 42. Shaft 42 by means of sprocket 41 and chain 40A drives sprocket 40 and in turn shaft 33, shaft 33 driving the escapement 405 as already described. Shaft 46 extends through the structural supporting wall 37 and is provided on the external surface of wall 37 with a V pulley 48 and sprockets 47 and 49 all affixed to rotate in unison. On the opposite end of the shaft 46 there is provided another sprocket 47 which is in alignment with another sprocket 74 and connected thereto by a chain 75. Sprocket 74 is mounted on shaft $70^1$ to duplicate the chain drive on the opposite side. To insure correct alignment of the tile advancing on the flat top chains 44, a pair of guides 61 are mounted either side of each flat top chain and in alignment therewith. Thus the sides of the tile are aligned by the guides 61 as the tiles advance along the guide 61 while supported on the flights of chain 44 and pass onto conveyors 73 and $73^1$. Thus the tiles are aligned and in a centralized position on conveyors 73 and $73^1$. Referring again to shaft 46 (FIGS. 1B and 2B), the sprocket 49 at the end of shaft 46 is connected by a chain 80 to a sprocket 81 that is mounted on a shaft 82, shaft 82 being supported by a journal or bearing 83 which in turn is supported and affixed to the base 26. Shaft 82 at its opposite end is provided with a second sprocket 84 which is driven by a chain 85, the chain 85 at its opposite end connected to a sprocket 86 of a roller cam indexing device 204 (to be described) (FIGS. 21 and 22) in unit 22. Referring again to shaft 82, in addition there is provided a sprocket 87 to permit mounting an endless chain 89. The chain 89 drives a sprocket 88 mounted on a shaft 90. Shaft 90 drives a bevel gear 91 which meshes with and drives a bevel gear 93 mounted on a shaft 92, shaft 92 extending upward to drive a sprocket

94. Sprocket 94 is connected by a chain 94A to drive another sprocket 60. Sprocket 60 is mounted on a shaft 63 that extends upward to support a bevel gear 64. Gear 64 meshes with and drives a second bevel gear 65. Gear 65 is mounted on a stub shaft 66. A coupling 95 connects the stub shaft 66 to the shaft 99 of the tile transfer or flow divider device 96. The tile transfer or flow divider device 96, illustrated in FIGS. 1B, 2B, 4 and 5, is comprised of a supporting upright 97 that rests upon the base 26, the supporting upright 97 at its upper end supporting a cantilever cross beam 98. At the upper end of upright 97 where the cross beam 98 adjoins, there is a bearing 99 in which shaft 100 is supported. Coupling 95 is affixed to shaft 100 to drive shaft 100. Shaft 100 on the opposite side of upright 97 is provided with a flywheel 101 affixed to rotate with shaft 100. Flywheel 101 is provided with a drive pin 102 on its outboard face which serves as the crank journal to drive a slide pusher mechanism 103 in crank 109. In addition to upright 97 there is a second upright 104 also mounted on the base 26 and spaced from upright 97. Upright 104 is provided with a bearing 105 at its upper end to support a shaft 106. Affixed to shaft 106 is a crank arm 107 that is freely rotatable through bearing 105. It is to be noted that shaft 106 is not in alignment with the drive shaft 100 but rather shaft 100, FIG. 4, is positioned to the right and above shaft 106 thus it is off center with relation to shaft 106. The construction thus described, constitutes a drag link mechanism through which the conventional slider-crank pusher device is driven, and when suitably proportioned, modifies the harmonic motion type of pusher output, to provide essentially constant velocity during the forward stroke, coupled with rapid return. Crank 107 in addition to being mounted on shaft 106 is provided with a pin 108 at its upper end. Pin 108 is also connected by means of an adjustable link 109 to flywheel 101. Link 109 is provided with bearings 110 and 111 at either end thereof. Bearing 111 is mounted in a rotatable relation on pin 102 of flywheel 101. Thus as connected, when drive shaft 100 rotates flywheel 101, pin 102 will, by means of the adjustable link 109, pull pin 108 to move crank 107 in a complete rotary motion. The rotation of crank 107 is utilized to drive a connecting rod 113, which in turn drives the pusher assembly 103. This pusher mechanism 103 is mounted on the cantilever cross beam 98 and is comprised of a slide track 115 that is spaced from beam 98 and affixed thereto by means of a pair of blocks 116. Mounted on the slide track 115 is a shoe or block 117 that will slide easily along track 115 in an upright position as illustrated in FIG. 4. This is insured by making the block fit snugly around the rectangular track 115. Block 117 is connected to the connecting rod 118 which has bearings 119 and 120 at either end thereof, bearing 120 being connected to but freely rotatable upon a pin 121, pin 121 being affixed to block 117. Rod 118 at its opposite end is connected by means of bearing 119 to pin 108. Thus the rotary movement of arm 107 will provide a forward and backward stroke via rod 118, to the block 117 which rides back and forth on track 115. Block 117 supports a triangular lever 125 by means of a pivotal supporting pin 126. The triangular lever 125 is provided with a pin 127 having a roller 128 mounted thereon. At the upper end of the triangular lever 125 there is a further pin 129 supporting an L-shaped over-centering element 130 used to retain the triangular lever 125 in either its down position, FIGS. 4 and 6 and as illustrated in dotted lines in FIG. 4, or its up position, FIG. 7. The over-centering device 130 is pivotally mounted on pin 129. Also pivotally mounted on pin 129 is a rotatable hub 131 and extending at right angles to hub 131 and shaft 129 and mounted in hub 131 is a pin 132. Pin 132 extends outwardly through arm 133 of said L-shaped element 130, a compression spring 134 is mounted about pin 132 between arm 133 of the L-shaped element 130 and the hub 131. The other arm of element 130 is pivotally mounted on a pin 129 that is affixed to shoe 117. Thus with element 125 pivotally supported at 126, it would move freely from the full line position to the dotted line position, FIG. 4. To retain element 125 in either of these positions, the centering element will flip or be forced to flip by the spring 134, FIG. 6, pushing shaft 129 to the left and holding element 125 in the down position. However, when 125 is moved to its up position, the centering element will flip to the opposite side, FIG. 8, pushing shaft 129 to retain element 125 in its up position. The movement of element 125 is controlled by a roller 128. At either end of track 115 there is a cam 140 and 140$^1$ with a cam face 141, 141$^1$. As shoe 117 is moved toward cam 140, with the pusher in the down position (full lines), roller 128 will abut with face 141 and roll down face 141 as indicated in dotted lines thus moving element 125 to its up position (dotted lines) where it is retained by the overcentering device. Element 125 will then return to the left by the movement of arm 118 pulling the shoe 117 until roller 128 abuts with cam face 141$^1$, the roller 128 moving up the cam face 141$^1$ as illustrated in dotted lines to pivotally move element 125 to its down position (full lines) whereupon the direction of shoe 117 is reversed and again moves the pusher element 146 in its down position to push the tile from the supply line to the second line on conveyor 24$^1$. The timing of the complete cycle of movement of the pusher 103 is arranged in synchronism with the supply conveyor 27 so that every other tile is pushed from the conveyor 24 to the parallel conveyor 24$^1$. The function of the tile transfer or flow divider device 96 is to push alternate tiles from the conveyor 24 to the conveyor 24$^1$. In order that the tile may be moved by pushing without being abraded or cocked, it is accomplished by pushing the tile obliquely downstream in the direction of their normal flow and maintaining a constant velocity. The lever 125 is caused to be retracted as previously described during the return stroke of pusher 103 in order not to disturb the alternate tiles which are not to be transferred, but which are to continue along upon conveyor 24. It is also to be noted that the pushing stroke of the pusher mechanism 103 is at a slower speed than the return stroke of the pusher so that the tile are handled at a velocity that will not chip or break them. It is to be further noted that element 125 at its extended point 145 is provided with the pusher face 146. Face 146 is a flat face positioned at an angle with respect to element 125 but, referring to FIG. 1B, is in a parallel relationship to the axis of conveyors 24, 73 and 24$^1$ so that face 146 will abut with the side of a tile supplied on conveyor 24 and will push the tile from conveyor 24 to conveyor 24$^1$ in an aligned position to continue its movement and pass through the guides 61 in perfect alignment as it continues on belt conveyor 73$^1$, that is, the end of their travel would allow the tile to tumble over and off the belts except for the fact that stops 150 are positioned at this point so that the tile will abut with the stops thus stopping the movement of the tile until the pick up mechanism, particularly the pick up fingers 152, lifts the tile for its next step of operation. The stops 150 are mounted to the framework 151 (FIG. 2) that surrounds the conveyors 73 and 73'. Stops 150 are between each pair of pick up elements 152 so that they do not interfere with the movement of the pick up elements in picking up the tile. It is to be also understood that there is an open space either side of said conveyor belts 73, 73' to permit the pick up elements 152 to move into position under said tile to pick up said tile.

Referring to unit 22, FIGS. 1A, 2A, 16 and 17 which provides the next stage of operations in the movement of the tiles, there is a base 160 to support unit 22. Spaced either side of the advancing lines of tile from conveyors 73 and 73' on base 160 there are upright supports 161 and 162. Because of the necessity to rotate two elements on different centers, support 161 has a circular track or ring 163 attached to the support 161 in a fixed position. A transfer mechanism 164 that is formed generally as a circular spool shaped element 181 having two discs 165, 166 on either side thereof is supported and rotatable about a center 167. Therefore the ring 163 is centered on an axis 167. Protruding from disc 166 on its exterior side are a plurality of pins 168 having rollers 169 affixed thereto but rotatable thereon. Rollers 169 are positioned in a circular pattern to bear upon ring 163 to thus support disc 166 of element 181 in a rotatable position. The spool shaped element 181 is thus supported on axis 167 on one side by ring 163 and on the opposite side by shaft 171 and is rotatable upon this shaft. Shaft 171 is mounted in a stationary relationship in a hanging arm 173. Arm 173 in turn hangs upon and is supported by a further stationary shaft 174. Shaft 174 is in turn supported in the upright 162 to thus retain shaft 174 as illustrated in FIG. 16.

The transfer mechanism 164 (FIGS. 16 and 17) although generally a spool shaped element, includes another disc 175 and a multiplicity of connecting elements 178. Disc 165 of the spool shaped element 181 rotates about one center 167 and disc 175 rotatably mounted on shaft 174 which is offset from the center 167. The two discs 165 and 175 are interconnected by a multiplicity of connecting hangers or cranks 178. The cranks 178 are pivotally connected to discs 165 and 166 at their base by a fixed shaft 179, that is fixed with relation to crank 178 but rotatable in discs 165 and 166. The opposite end of crank 178 is pivotally mounted on a pin 180, pin 180 being affixed in disc 175. Disc 175 is rotatably supported on shaft 174, while disc 165 is rotatably supported on a shaft 171. Disc 165 is also connected in fixed relationship to disc 166, by a drum 163'. Thus the two discs 165 and 166 and the drum 163' form the spool shaped rotatable element 181. A stationary mounted drum 182 is suspended from the support 161 and extends within the hollow center of the spool shaped element 181. At the opposite end to its support end drum 182 also supports one end of shaft 171. The drive shaft 203, extending from the indexing drive device to be described later, extends through drum 182 and is provided with a drive gear 207 adjacent to disc 165. A ring gear 172 is rotatably mounted on shaft 171 to mesh with gear 207. Gear 172 is retained in fixed relation with disc 165 by a plurality of bolts. Referring to FIGS. 16 and 17 it is apparent that when shaft 203 is driven, gear 207 will drive gear 172 and disc 165. Disc 165 being a part of the spool shaped element 181 to thus rotate the complete element. With the rotation of element 181 the multiplicity of shafts 179 will be moved in a rotative direction by element 181. However due to the hanger cranks 178, shafts 179 can not rotate, but can move with element 181 pulling disc 175 in the direction of their movement to rotate disc 175. Referring to FIGS. 16 and 17, each shaft 179 is provided with two pair of the pick-up fingers 152 positioned in spaced relation to be in their proper relation with the conveyors 73 and 73' as already described. With each pair of pick-up fingers 152 affixed in proper relationship to shafts 179 the pick-up fingers 152 will move with the rotation of element 181 but will remain in a horizontal position as illustrated. This is due to the shafts 179 and hangers 178 remaining in a non-rotative position with relation to element 181, although all hanger cranks and the complete driven assembly does rotate. Each shaft 179 is also provided with a guide 245 (to be described later) centrally positioned between each pair of pick-up fingers 152. The drive of the transfer mechanism may be followed from a varidrive motor 200 mounted in the base of unit 22. The varidrive motor 200 driving through pulley P and belts to drive a fly wheel F mounted on input shaft 201 of a roller cam indexing device 204. Also mounted on shaft 201 is sprocket 202 in turn supporting and driving chain 85 that is connected to input sprocket 84 of unit 21 as already described, this drive being a continuous uninterrupted drive. This roller cam indexing device 204 (to be described later) provides an intermittent rotation to an output shaft 203, which in turn drives or rotates the transfer mechanism 164 in steps to provide an indexed period of stationary rest of the transfer mechanism between each step of rotation. Shaft 203 extends through the roller cam indexing device 204 and on one side of the device 204 there is provided a sprocket 205 affixed to the shaft 203 to be rotated in the same intermittent cycle of rotation, sprocket 205 driving a chain 206 that is connected to unit 23 to drive same. Shaft 203 passes through the support 161 through the open center of ring 163 and through the open center of the fixed drum 181 to drive the transfer unit 164 as already described, thus rotating the transfer mechanism 164 step by step as already indicated. Supported on the support 161 and extending into the center of the fixed drum 163' is a platform 208, FIGS. 8 and 9. Also extending into the center of the fixed drum and positioned under platform 208 is a pusher mechanism 209. Mechanism 209 may be traced from its origin starting with shaft 201 of the varidrive unit 200. Shaft 201 having a continuous uninterrupted drive passes through the housing 204 and is provided with a gear 210 affixed to shaft 201 and driven by shaft 201. Gear 210 meshes with a gear 211 that is mounted on a shaft 212, the shaft 212 being supported in a bracket 214 supported by the framework 160. At the opposite end of shaft 212 there is a second gear 215 that in turn meshes with a gear 216 (FIG. 8), gear 216 being mounted on a shaft 217, shaft 217 being supported under the platform 208 by a supporting structure 218, shaft 217 extending inward under platform 208 and provided with a bevel gear 219 (FIG. 10) that is affixed to its opposite end to be rotated by shaft 217. Bevel gear 219 is in turn meshed with a second bevel gear 220 that is mounted on a vertical shaft 221, shaft 221 also being supported by its bearings mounted in the supporting structure 218. At the opposite end of shaft 221 there is a crank disc 222 affixed to shaft 221 and rotatable with shaft 221. Crank disc 222 is provided with an eccentric pin 223, pin 223 in turn supporting a roller 224 above crank disc 222. Also supported in the structure 218 is a pivot pin 225. Pivotally mounted on platform 208 by pin 225 is an arm 226. Arm 226, through its center portion, is provided with a slot 227 into which roller 224 fits and is rotatable therein to move arm 226 in an oscillating movement with the rotation of cam crank disc 222. The opposite end of arm 226 is provided with a slot 228 in which roller 230 rides, roller 230 being mounted on a pin 231, pin 231 being supported in a pusher shoe 232, shoe 232 being T shaped with pin 231 mounted in the center arm of said T and the ends of said T shoe carrying a pair of pusher rods 233 and 234. The pusher shoe 232 is mounted on the platform 208. Platform 208 at its center, FIG. 9, is provided with a slot 235. The pusher shoe 232 is slidably mounted in slot 235 by means of its portion 236. The rods 233 and 234 mounted in shoe 232 extend across the platform 208 and through a pair of guide bushings 237 and 238 and at the end of rods 233 and 234 there are a pair of tile contacting elements 239 and 240 affixed to the end of the rods 233, 234 respectively. It is apparent that with the drive shaft 201 providing a continuous drive that by means of the connecting gears and shafts, shaft 217 will drive cam 222 in a counter-clockwise direction which in turn will move arm 226 from its retracted position holding shoe 232 retracted as illustrated in FIG. 9 to a forward projected position as illustrated in dotted lines thus moving tile contacting elements 239, 240 back and forth for each pushing cycle. It is to be noted that platform 208 is positioned in the transfer mechanism 164 so that the pusher elements 239 and 240 will align with the tile when a tile or tiles reach the discharge position and have stopped while still resting upon the tile pick up fingers 152. Thus the ejector or forward stroke of the pusher elements 239–240 will transfer the tile from fingers 152 out of unit 22 into a setter or tile holding ceramic element 250 in unit 23. To insure a smooth transfer of the tile from fingers 152 to the setter unit, there is provided a pair of guide elements 245 (FIGS. 14, 15 and 16) that are pivotally supported on each of the shafts 170. Each guide element 245 has an elongated lip 246 which abuts with a stationary rod 247 of unit 23 thus lifting guide 245 into an aligned position to guide the tile over the surface of the guide and into a slot 251 in the setter 250 (FIG. 12). The guide element 245 (FIG. 15) drops to the position as illustrated when it has passed rod 247 and is retained in this position by a stop 252 on the transfer unit for the remainder of the rotation of the transfer unit 164. Thus the opposite end 253 of the guide element 245 presents a stop face slightly raised above the surface of fingers 152 so that the tile will not be displaced until the tile reaches the discharge or ejecting position as described and shown in FIG. 14.

Unit 23 is positioned to abut with unit 22. Unit 23 is supported on a pair of supporting elements 260 that are supported upon the ground in line with the remainder of the unit. A pair of parallel frames 261 extend upward from elements 260 and at the top of the frames 261 there is a connecting member 262 and at a midpoint in the framework 261 there is a second connecting member 263. Supported within this framework is an elevating mechanism 265 which comprises a pair of supporting shafts, the upper one 266 and the lower one 267. Mounted between the parallel spaced frame 261 are shafts 266–267 and 267A which carry the elevating mechanism. Affixed to shaft 266 are a pair of sprockets 268 and 269 positioned in spaced relationship. Also affixed to shafts 267 and 267A are pairs of similar sprockets 270, 271 in parallel relationship to sprockets 268, 269 and a pair of endless chains 272, 273. These are positioned with chain 272 about sprockets 268 and both sprockets 270 and chain 273 about sprockets 269 and both sprockets 271. A multiplicity of setter lifters 275, FIGS. 2 and 3, are attached to the outer periphery of the endless chains so that they will move downward on one side of the framework 261 and around sprockets 270 and 271 and move upward to a setter loading pick up position 276. A setter pick-up station 276 may be a simple platform sliding the setter 250 into position for pick up by the setter lifter elements 275. To assist the setters in retaining their exact position upon the lifter 275 there are provided a plurality of rollers 281 mounted on elements 278 so that as the setter 250 rises the edges of the setter will abut with the rollers 281 on either side thereof retaining them on a central axis. This is most important in order that the setter 250 and particularly the shelves 251 may be perfectly aligned with the two lines of tiles as the tiles are ejected from unit 22 into the setter unit. It is to be further noted that the drive of the chains 272–273 is provided through shaft 266 that is, at the end of shaft 266 there is a gear 266A that drives a second gear 283A. Gear 283A is in turn mounted on shaft 283B and a sprocket 283 is mounted on the end of shaft 283B. Sprocket 283 is in a plane with a pair of sprockets 284 and 285 that are mounted upon the upright frame 261 and the three sprockets are in a plane with a drive sprocket 205 mounted on shaft 203. An endless chain 206 is mounted about sprocket 205 under sprocket 284 around sprocket 283 over sprocket 285 and back to sprocket 205. Thus the intermittently driven shaft 203 drives the elevating mechanism intermittently in synchronization with the intermittent movement of the transfer mechanism, so that the setters 250 are lifted one slot 251 at a time to align each slot with the tile that is to be ejected into each slot 251 in a repetitive operation. Referring to FIG. 12 which illustrates the setter 250, it is apparent when the setter 250 is mounted in the unit 23, FIG. 2, that each tile will be loaded into a slot and due to the movement of the setter from the lowest position on platform 276 moving upward the tile will start loading with the top slot and the setter will be moved one index I upward for each intermittent drive of the elevating mechanism. The spacing of each index is illustrated in dotted lines with relation to the shelves or slots of the setters 250. When the last or bottom shelf 251' of the setter is loaded with a tile, the spacing between the last shelf of this setter and the first shelf of the next setter is greater than the index I. The elevating mechanism 265 however continues to lift and dwell in equal increments, and a means of providing a halt in the flow of tile to the pick up fingers serving the empty spaces between setters must be implemented. This is done via selective control of the escapement device 245. This is accomplished by providing a switch E at the top of the elevating unit 23 so that when the lifter 275 bears against a normally open switch E as it turns over sprocket 266A, switch E, FIG. 18, will be momentarily closed completing a circuit from transformer T' through switch E to solenoid 416 and from the opposite side of solenoid 416 back to transformer T'. Thus solenoid 416 will be momentarily energized pulling a pivotally supported element 417 by means of rod 418. Element 417 is provided with a roller 419, roller 419 bears against the bottom surface of element 406 holding the pivotally supported element 406 to support it in the dotted position, FIG. 19, thus stopping the flow of tile. Element 417 remains in the dotted position due to an over center toggle 417'. When another lifter 275 mounted on chains 272–273 abuts with a momentarily open switch F mounted at the bottom of the travel of the chains, the closing of switch F, FIG. 19, will complete a circuit from the transformer T' through switch F to solenoid 415 back to transformer T'. Thus when solenoid 415 is momentarily energized, the rod 418, that is pivotally attached to element 417, will pull element 417 to the full line position illustrated thus allowing the pivotal element 406 to drop and release the flow of tile. In this manner the escapement device 405 is employed to periodically halt the flow of tiles during the interval between the last tile inserted in a setter moving upward and the first tile in the next setter and then resume the normal timed delivery of tiles.

The setters 250 are automatically discharged from unit 23, by a pneumatic mechanism as illustrated in FIG. 13. When the setter 250 reaches the top of its travel, it will close a normally open switch C12. Switch C12 is in a circuit connected to a solenoid 300. The solenoid 300 actuates a four way two position valve 301, FIGS. 13 and 18. In the energized position of solenoid 300 air under pressure supplied through inlet 302 will pass through valve 301 and out outlet 303, charging into the inlet 304 of a power cylinder 305. The air pressure will actuate the piston 306 to the right. FIG. 13, thus carrying the setter pusher 307 that is abutting the setter 250 to the right, thus ejecting the setter 250 from unit 23 onto a discharge platform 318. When the setter 250 is moved to the right, switch C12 will open, as it was retained closed by the setter at its top or elevated position. The opening of switch C12 will break the circuit of solenoid 300 de-energizing the solenoid and the discharged setter 250 will abut with and close a switch D12. Switch D12 when closed completes a circuit through solenoid 308 that is located on the opposite side of the two way valve 301. When solenoid 308 is energized, the spool 309 moves to the left, FIG. 18, in this position the air pressure supplied through inlet 302 will pass through valve 301 and out outlet 310 into the return port 311 of the power cylinder 305. The air pressure will again actuate the piston 306 this time to the left, FIG. 13, thus resetting it for its next discharging operation. On the return stroke the air pressure in cylinder 305 to the left of piston 306 will be expelled through port 304, through the valve casing 301 and out one of the outlet ports 312, thus the mechanism is reset for the next ejection stroke of the setter 250 when it reaches its top elevated position. Also associated with the circuit in FIG. 13 are two safety switches E12 and F12 so that when the setter 250 rises to the ejecting position to close switch C12, it must stop to be ejected. Since the setter has been elevated one index or one stop at a time (each step being equivalent to the spacing of the shelves) the setter should not move upward above the ejecting position. To prevent malfunctioning, switches E12 and F12 are mounted at the level of the top of a setter when it reaches a discharge elevation. The switches are normally closed and being in series in the motor relay circuit, the motor drive is not interrupted, unless the elevating mechanism moves the setter upward an additional step due to a malfunction, such as the failure of the ejecting mechanism to move the setter out of the way for the next setter to rise. In this event the upper surface of the setter will lift and open switches E12 and F12 and stop the motor and the operation of the complete machine. Referring to FIG. 18 which is a schematic of the operating circuit and components, there is provided a three line 220 volt supply 342, 343, 344. The potential is suppplied from the three lines through a line switch 340. On the opposite side of switch 340, lines 345, 346 and 347 are connected to three switches R1, R2, R3 that are operated by relay R. The opposite side of switches R1, R2, R3 are connected by means of lines 348, 349 and 350 to motor 200. Also illustrated in the circuit is a transformer T to provide a 110 volt circuit. T is connected by means of lines 351 and 352 to lines 345 and 346 to thus provide the 110 volt potential. The opposite side of transformer T is connected to one side of relay R by a line 353 while the opposite side of transformer T is connected by a line 354 to switch R4 of relay R, the opposite side of switch R4 is connected by line 355 to switch PC (FIG. 19). The opposite side of switch PC is connected by line 356 to one side of the safety switch E12 while the opposite side of the safety switch E12 is connected by line 357 to one side of switch A12. The opposite side of switch A12 is connected by a line 358 to the opposite side of relay R. Thus with switches PC, E12 and A12 closed, relay R will be energized and switches R1, R2, R3 and R4 will be closed. It is to be noted that switch A12 is closed by energizing relay R' and relay R' is energized by a circuit from a 10 volt transformer T', transformer T' being connected by the same lines 351 and 352 that provide potential to transformer T, the opposite side of transformer T' being connected by a line 334 to relay R1 and the opposite side of relay R1 is connected by a line 331 to the normally closed switch F12, FIG. 13, and the opposite side of switch F12 is grounded and similarly the opposite side of transformer T1 is grounded. Thus with switch F12 closed, relay R1 remains energized and switch A12 remains closed. However as already stated with relation to FIG. 13, when there is a malfunctioning of the elevating mechanism and the setter 250 rises above its ejecting position, switch E12 and F12 are lifted to be opened thus de-energizing relay R1 to break switch A12 and of course lifting switch E12 so that the circuit to relay R is broken de-energizing relay R and releasing all of the circuit breaker switches R1, R2, R3, R4 and stopping motor 200. The starting switch S, FIG. 18, is provided, that is, with switches PC, E12, A12 closed as they should be for normal operation, by closing switch S the energizing circuit for relay R may be completed. The circuit may be traced by the energy passing from transformer T through line 354 through the shunt circuit comprised of line 360, the closed switch S, line 361 to line 355 through switch PC, line 356, switch E12, line 357, switch A12, line 358 to relay R and from the opposite side of relay R through line 353 to the opposite side of transformer T thus energizing relay R and closing the motor operating circuit. With the circuit closed, switch S may be dropped out to the dotted position as illustrated as switch R4 will remain closed as long as relay R is energized and the operating circuit can only be interrupted by the opening of switches PC, E12 or the combination of switches F12, A12.

Roller cam indexing device 204 already referred to is of course an essential part of this mechanism in order to produce the required intermittent step drive to both the transfer pick-up mechanism 164 and the setter or tile holding elevating mechanism 265, both being synchronized to operate in measured and indexed steps to insure the stopping of both units 164 and 265 in an exact relationship to permit the pusher mechanism 209 to transfer the tile from unit 22 to unit 23. The pusher mechanism 209 is designed to be driven by a continuous uninterrupted drive synchronized to produce one ejecting stroke for each of the index steps of the mechanism 164 and 265. The roller cam indexing device 204 is comprised of a housing 204 (FIGS. 1, 2, 20 and 21) that contains a connecting cam linkage to transmit the drive from the continuously driven shaft 201 to the intermittently driven shaft 203. Referring to FIGS. 21 and 22 the structure and operation of the roller cam indexing device may be followed. For each revolution of the input shaft 201 there will be one cycle (index and dwell) of the output shaft 203. In FIGS. 21 and 22 the housing 204 is hollow. Thus it may be described as having a bottom or base wall 199 and top wall 198 and end walls 197, 196 as well as a front wall 195 and rear wall 194. The housing 204 may be constructed in two pieces, front and back sections for convenience. The front and back walls 195, 194 are provided with aligned openings 192–193 and 191–190 into which are mounted bearings 189 held in place by bearing blocks 188 that are affixed to the housing 204. Shaft 201 is mounted through bearings 189 in openings 192, 193, while shaft 203 is mounted through bearing 189 in openings 190–191. Mounted on shaft 201 are two cams 187 and 186 that are positioned in spaced relation to each other and keyed to shaft 201. Mounted on shaft 203 is a circular plate 185 that fits between cams 187 and 186 and has no contact therewith, cam 185 being keyed to shaft 203. A plurality of rollers 184 are affixed to either side of plate 185 and positioned in spaced relationship about cam 185 but in alignment with cams 186 and 187. FIGS. 21 and 22 illustrate a dwell position, that is, although shaft 201 is turning clockwise, the peripheries 183 of cams 187, 186 simply move against rollers 184 without moving shaft 203. However, when the greater diameters 182 of cams 186 or 187 reach the surface of rollers 184, they will not pass but will produce a rolling push to move the rollers in a counter-clockwise rotation, thus moving cam 185 counter-clockwise and also moving shaft 203 counter-clockwise. The degree of movement of shaft 203 is based upon the design of cams 186 and 187. In this embodiment a rotation of shaft 201 produces 90° of rotation of shaft 203, thus during a complete rotation of shaft 203 there are four periods of dwell. Through gears 207 and 172 (FIG. 16) which are in a 1.3 ratio respectively, each index of unit 204 rotates the transfer mechanism 38.

Figure 1A:
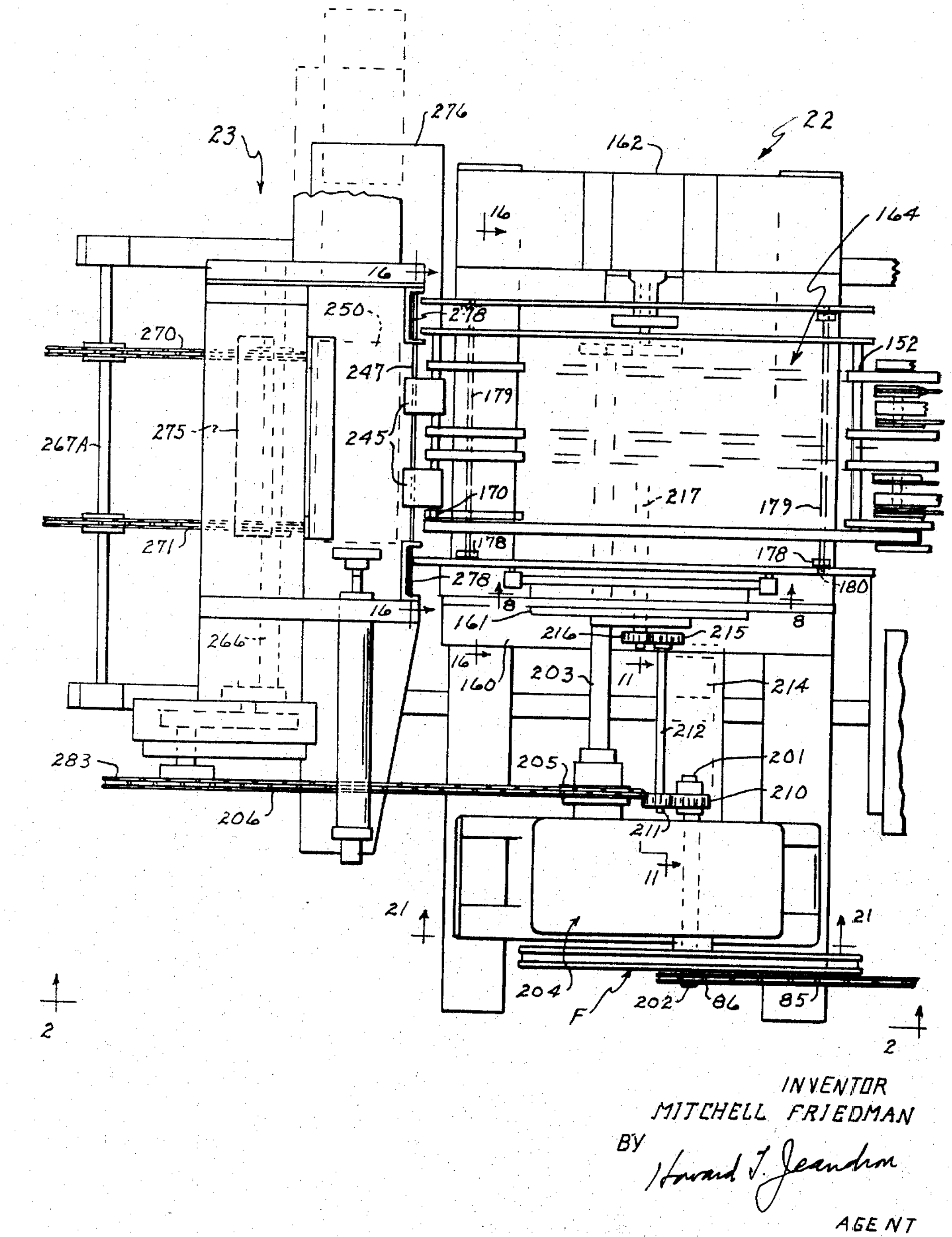
FIGS. 1A and 1B are a plan view of the device.
Figure 1B:
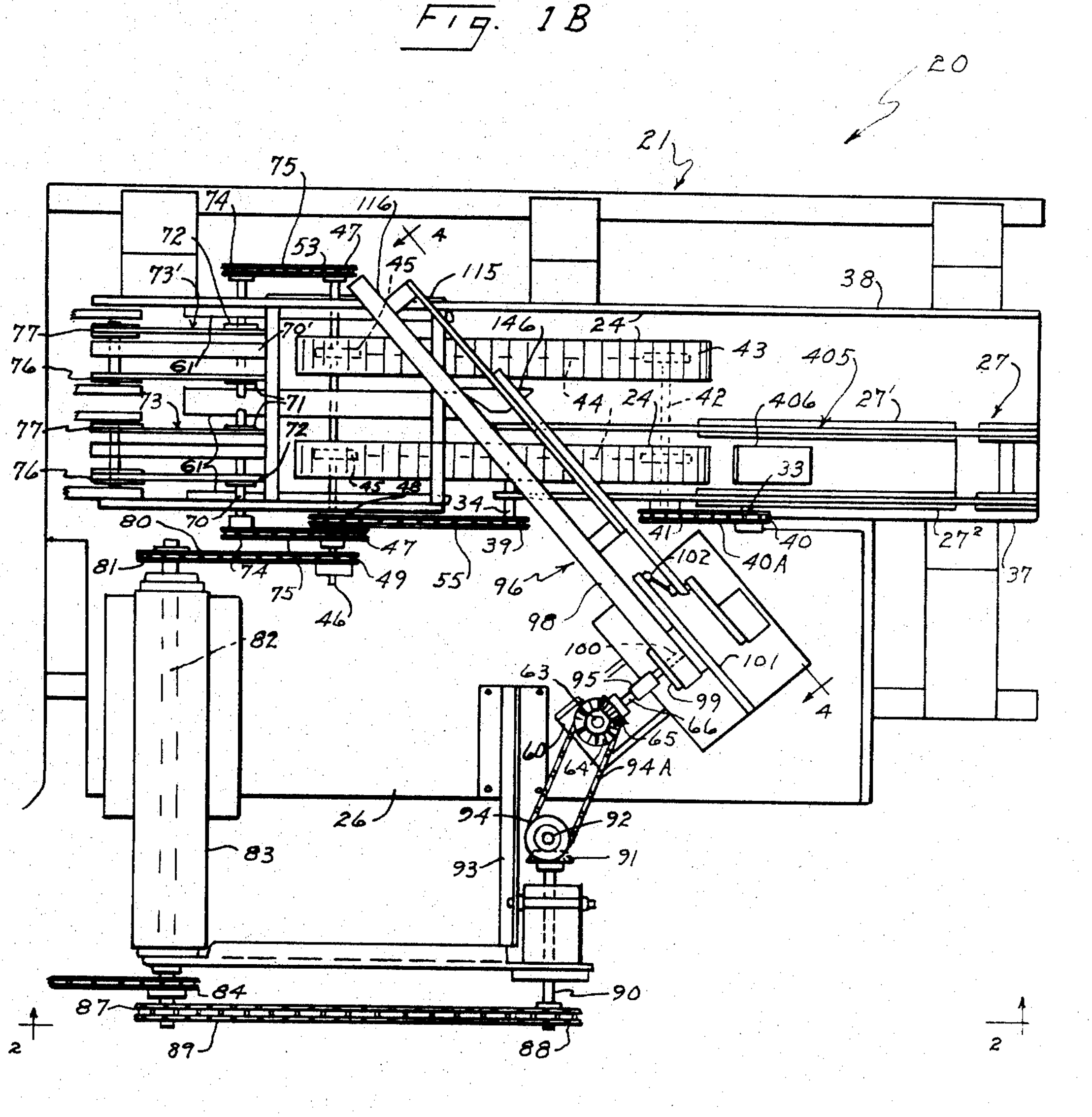
Figure 2A:
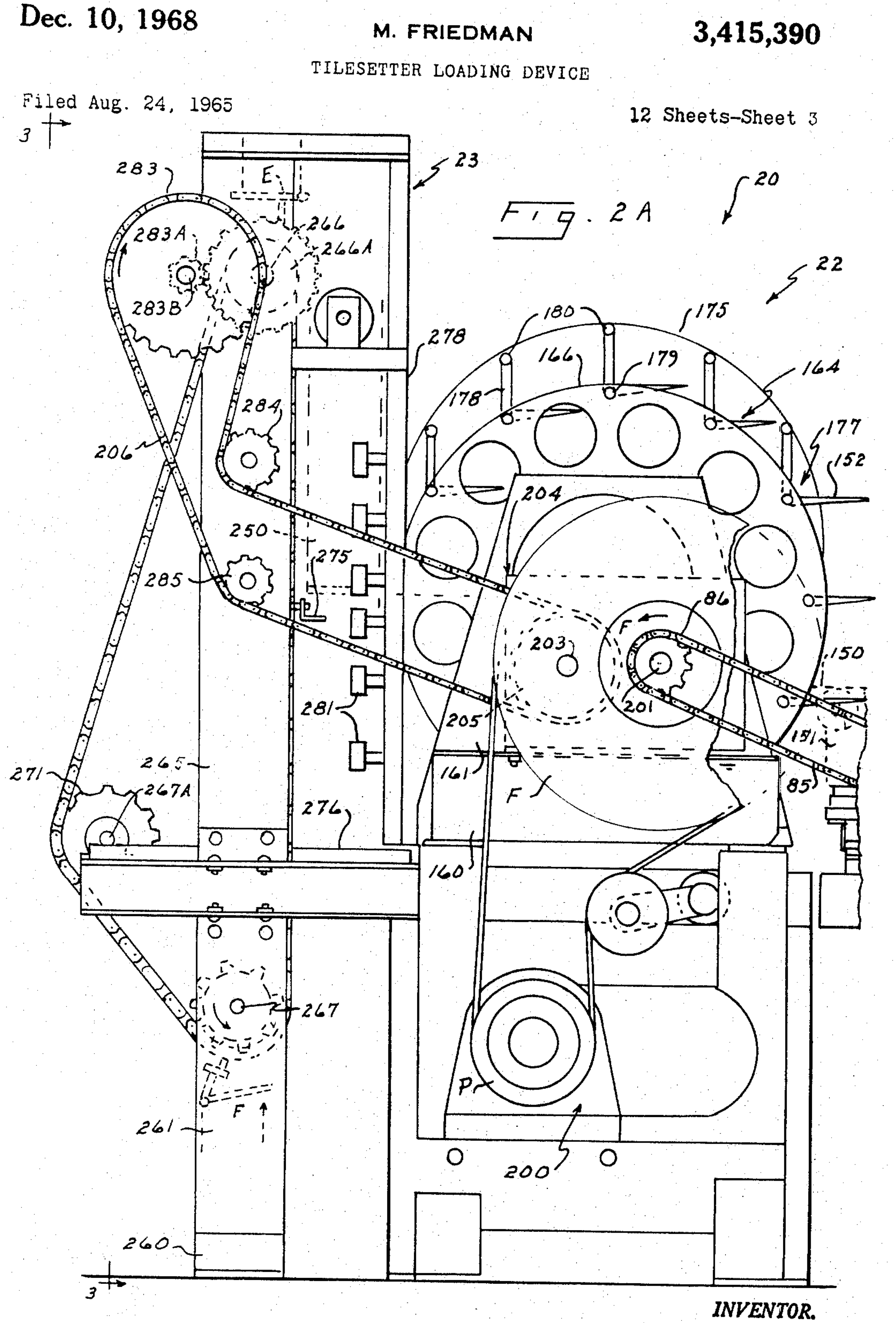
FIGS. 2A and 2B are a side elevational view taken on line 2—2 of FIG. 1.
Figure 2B:
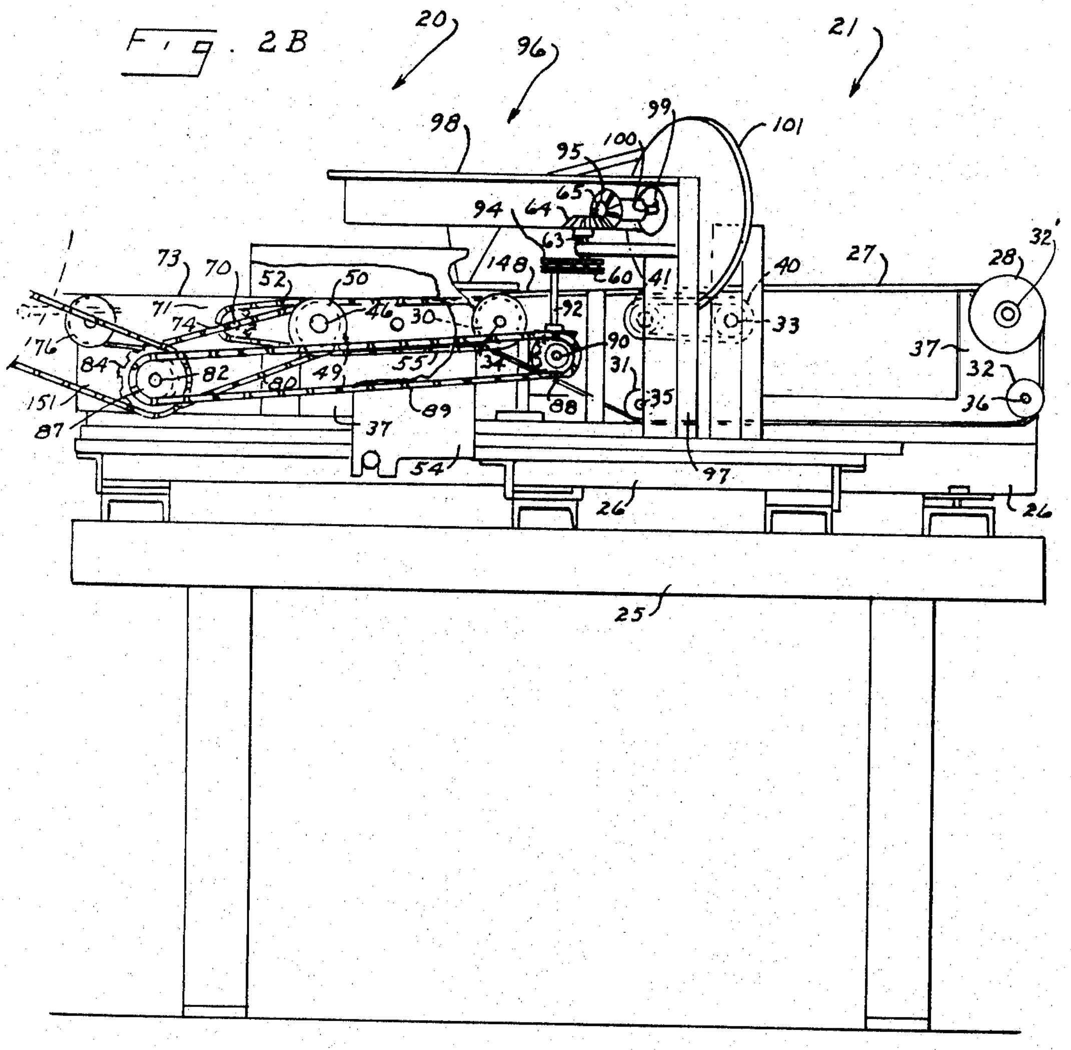

It is apparent that although the machine illustrated in FIGS. 1A and B and 2A and B are actually divided into three units, they are so interrelated that they become a single mechanism in the handling of unfired tiles in their flow path from formation to firing. Further, although unit 21 operates in a unique fashion to perform a transition of a single line of tile into a double line, there are other functions that become apparent and the whole purpose of unit 21 becomes necessary to the complete operation because of the particular design of the tile holders or setters utilized. They are a ceramic block with a double tier of slots to receive and hold tile (FIG. 12). The single line supply of unfired tile is also a pre-designed inherent characteristic. Therefore the function of unit 21 is to divide this single line supply of tile into a double line flow.

What is claimed is:

1. In an apparatus for receiving and conveying uniformly prepared unfired glazed surface tiles to be stacked in setters for firing in a kiln the combination of:

(a) a first conveyor means including an escapement means to control the timed flow of said tiles, (b) a second conveyor means parallel to said first conveyor means, (c) a flow dividing means including a pusher to push every other tile from said first conveyor to said second conveyor to provide a double line feed, (d) means to operate said pusher in timed relation to convey said tile from the first conveyor to the second conveyor while maintaining the constant forward velocity of the selected tile, said first and second conveyors adapted to advance said tile to a transfer position, (e) a transfer device that is intermittently driven to pick up each pair of advancing tiles from said two conveyors and move each pair of tiles horizontally into a loading position and stop, (f) a setter to receive the advancing tile, (g) a pair of identically driven pusher elements to move each pair of tile simultaneously from the horizontal stationary loading position into horizontal tile supporting slots in said setter, (h) an intermittently driven elevating conveyor to support and elevate said setters one slot at a time to receive each pair of tile as they are pushed from said transfer device into said setter until said slots are filled with tiles, (i) a motor to drive all components, at the same speed and timing, including an indexing device, said indexing device controlling the intermittent drive and dwell of said transfer device and said elevating conveyor.

2. In a conveying system according to claim 1 which includes a pusher ejector also driven at the same speed and timing to move said loaded setter out of the elevating conveyor when it reaches a discharge position.

3. In a conveying system according to claim 1 in which said flow divider device is mounted over said first conveyor and comprises a reciprocating slider moving obliquely to the path of tiles on said first conveyor.

4. In a conveying system according to claim 1 in which said transfer mechanism is driven intermittently which includes an indexing drive to rotate said transfer mechanism into a predetermined sector of a complete rotation and stop for a period of dwell before resuming its next sector of rotation and also includes said pusher elements mounted in said transfer mechanism and timed in their operation to provide two strokes, one forward ejector stroke and a return stroke during the dwell period of said transfer mechanism to thus transfer each pair of tile from said transfer mechanism to a setter in said elevating conveyor.

5. In a conveying system according to claim 1 in which said elevating conveyor is driven intermittently which includes a roller cam indexing drive to drive said elevating conveyor and elevate said tile holding setter retained in said elevating conveyor a prescribed distance to align each successive slot in said setter with each successive tile being ejected from said tile transfer mechanism and to stop for a dwell period during the tile transfer.

6. In a conveying system according to claim 1 in combination with a second pusher and an auxiliary electrical control system including a switch, in which each empty tile holding setter loaded onto said elevating conveyor is moved vertically upward one step at a time and stopped for a dwell period, said upward step of movement being indexed to an increment that is equal to the spacing of the slots in said setter, and said setter when elevated to the discharge position actuating said switch in said auxiliary electrical control system to energize said pusher and eject said loaded setter from said device.

7. In a device according to claim 1 in which the escapement means to control the timed flow of said tile comprises a holding means to retard the advancement of tile and a stop to separate the tile and provide equal spacing for further handling of the tile.

8. In a device according to claim 1 in which the escapement means comprises a stop to stop the flow of tile for the period between the last shelf of a loaded setter and the first shelf of an empty setter.

9. In a device according to claim 1 in which the tile picked up by said transfer mechanism are moved into position for said pusher elements to be loaded into the top shelf of a setter and means to subsequently load each shelf of said setter as said setter is moved in an upward progression.

10. In a conveying system according to claim 1 in combination with an auxiliary electrical control system including a sensing means to sense the interrupted flow of tile being supplied on the first conveyor and providing means to stop said device.

11. In a conveying system according to claim 1 in combination with an auxiliary electrical control system including a sensing means to sense the interrupted flow of tile setters on said elevating conveyor and provide means to stop said device.

References Cited

UNITED STATES PATENTS

| | | | |
|---|---|---|---|
| 1,427,825 | 9/1922 | Klein | 214—6 |
| 2,100,441 | 11/1937 | Greene | 214—6.1 |
| 2,936,908 | 5/1960 | Carothers | 214—6 |
| 2,966,251 | 12/1960 | Nussbaum | 198—31 |
| 3,122,240 | 2/1964 | Steels | 214—6.1 |
| 3,181,685 | 5/1965 | Brounner et al. | 198—31 |
| 3,221,902 | 12/1965 | Young | 214—6 |
| 3,295,703 | 1/1967 | Schiepe | 214—6.1 |
| 3,315,785 | 4/1967 | Shiffer | 214—16.42 |

GERALD M. FORLENZA, *Primary Examiner.*

R. B. JOHNSON, *Assistant Examiner.*

U.S. Cl. X.R.

214—16.6; 198—21, 31; 53—160